United States Patent
Cole-Rhodes et al.

(10) Patent No.: US 12,475,532 B2
(45) Date of Patent: Nov. 18, 2025

(54) IMAGE DEBLURRING USING A MULTI-LAYER LSTM NETWORK

(71) Applicant: Morgan State University, Baltimore, MD (US)

(72) Inventors: Arlene Cole-Rhodes, Bel Air, MD (US); Greig Richmond, Severn, MD (US)

(73) Assignee: Morgan State University, Baltimore, MD (US)

( * ) Notice: Subject to any disclaimer, the term of this patent is extended or adjusted under 35 U.S.C. 154(b) by 325 days.

(21) Appl. No.: 18/185,862

(22) Filed: Mar. 17, 2023

(65) Prior Publication Data
US 2023/0298147 A1 Sep. 21, 2023

Related U.S. Application Data

(60) Provisional application No. 63/321,012, filed on Mar. 17, 2022.

(51) Int. Cl.
G06T 5/20 (2006.01)
G06T 5/73 (2024.01)

(52) U.S. Cl.
CPC ............... *G06T 5/20* (2013.01); *G06T 5/73* (2024.01); *G06T 2207/20081* (2013.01); *G06T 2207/20084* (2013.01)

(58) Field of Classification Search
CPC .......... G06T 5/20; G06T 5/73; G06T 2207/20081; G06T 2207/20084; G06T 5/60
See application file for complete search history.

(56) References Cited

U.S. PATENT DOCUMENTS

| | | | |
|---|---|---|---|
| 11,790,489 B2* | 10/2023 | Ren | G06N 3/045 |
| | | | 382/100 |
| 2020/0027198 A1* | 1/2020 | Vogels | G06T 15/005 |
| 2020/0152333 A1* | 5/2020 | Tomasev | G16H 70/60 |
| 2021/0144110 A1* | 5/2021 | Tseng | G06V 20/20 |
| 2021/0312591 A1* | 10/2021 | Ren | G06N 3/0495 |
| 2023/0298142 A1* | 9/2023 | Lin | G06T 5/50 |
| | | | 382/255 |

OTHER PUBLICATIONS

Ople, Jose Jaena Mari, et al. "Multi-scale neural network with dilated convolutions for image deblurring." IEEE Access 8 (2020): 53942-53952. (Year: 2020).*

Zhang, Tianlin, Jinjiang Li, and Zhen Hua. "Iterative multi-scale residual network for deblurring." IET Image Processing 15.8 (2021): 1583-1595. (Year: 2021).*

(Continued)

*Primary Examiner* — Andrae S Allison
(74) *Attorney, Agent, or Firm* — Whiteford, Taylor & Preston, LLP; Peter J. Davis

(57) ABSTRACT

A scale-based, convolutional, long-short term memory (LSTM) network is developed for image deblurring. Multi-scale information is obtained using dilated convolutions shared between scales using recurrent connections resulting in low-parameter count and to deblur an image without the use of prior information. Effectiveness is evaluated with industry standard datasets. Results show that a comparable sharp image can be recovered more efficiently even with a significant reduction in the total number of network parameters.

9 Claims, 8 Drawing Sheets

(56) References Cited

OTHER PUBLICATIONS

Wang, Y., Wang, G., Chen, C. et al. Multi-scale dilated convolution of convolutional neural network for image denoising. Multimed Tools Appl 78, 19945-19960 (2019). (Year: 2019).*

Richmond, Greig, and Arlene Cole-Rhodes. "Image deblurring using multi-scale dilated convolutions in a LSTM-based neural network." 2021 55th Annual Conference on Information Sciences and Systems (CISS). IEEE, 2021. (Year: 2021).*

* cited by examiner

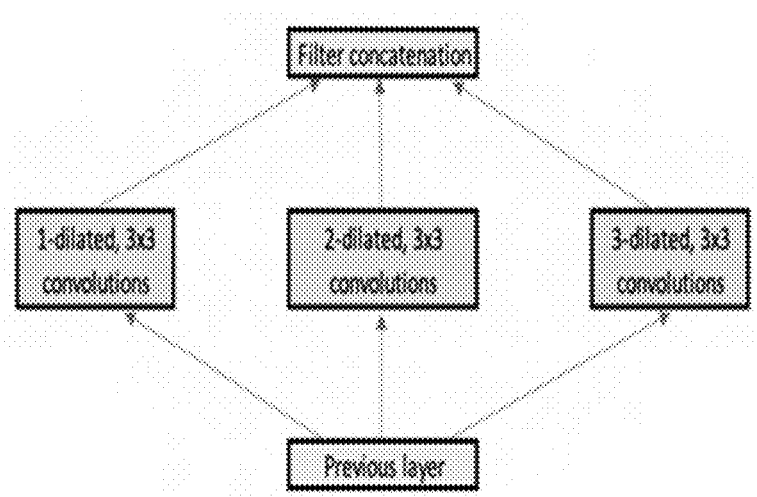
*Figure 2: Scale Inception Block*

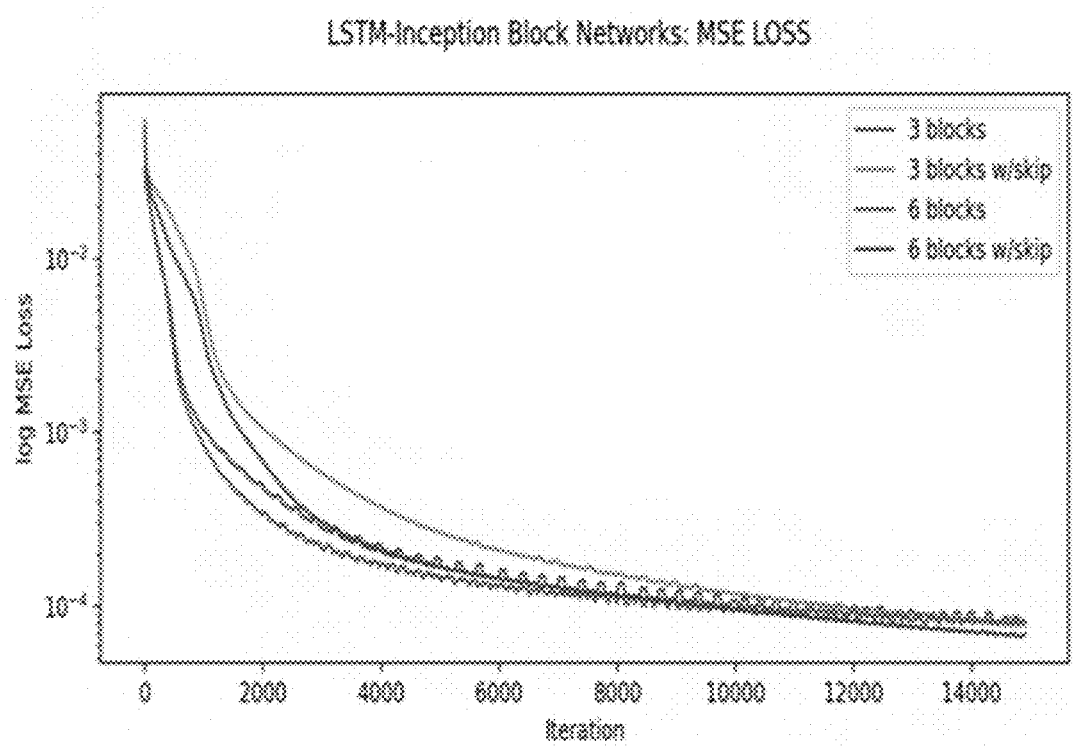
Figure 5: Network configuration training loss comparison.

*Figure 7: Deblurring results of Tao et al. and our method.*

IMAGE DEBLURRING USING A MULTI-LAYER LSTM NETWORK

BACKGROUND OF THE INVENTION

Field of the Invention

The present invention relates to the development of a compact neural network for the blind deconvolution and restoration of a blurred image.

Description of the Background

Blind image restoration methods aim to recover a 'sharp' image from a degraded or blurred image where the degradation process is unknown, and statistical information about the original image is unavailable. The degraded image is, in fact obtained from a nonlinear and shift-variant process, but most techniques that solve this problem assume that the degradation occurs via linear convolution with a shift-invariant point spread function (PSF). By solving this problem, one can improve the overall image quality without knowing the exact image acquisition mechanism or sensor calibration technique.

Traditional techniques for blind deconvolution approach the problem in two different ways. The first approach aims to identify the PSF, which has produced the blurred image, and then a standard image restoration method is can be used to deblur that image. The second approach simultaneously addresses both identification of the PSF while estimating the true image. This tends to lead to more complex algorithms with higher computational requirements [1].

Computer memory and computational power advancements in recent years have increased the availability and prevalence of neural network-based solutions to solve problems in computer vision. Neural networks can be trained for the end-to-end process of deblurring an image. Nah et. al [2] developed a multi-scale method for deblurring an image using a convolutional neural network (CNN). In this network, the image is processed at three different scales from coarse to fine, in a sequential manner. Each scale of the image is passed as the input to an identical network structure. The result at a coarse scale of the network goes through an up-convolution process and is concatenated with the next finer scale of the image. This new feature tensor is then used as input at the next level of the network. Note that up-convolution is a method of upsampling using a convolutional kernel. Concepts from [2] are applied by Tao et al. [3] to create a network that shares information between scales using a recurrent neural network (RNN), while bilinear interpolation is used to transition between scales. The same set of network parameters is used at each scale, so this reduces the number of parameters when compared to [2].

Another type of multi-scale approach is taken by Shi et. al. in [4] where the convolution kernel is dilated to mimic scaling of the image, instead of modifying the image to obtain different scales.

Neural network approaches often require GPU hardware acceleration due to the large number of computations required for training and speed. The number of parameters in modern image processing networks can be on the order of millions, which can limit its use to devices with high computational power and large memory.

Multi-Scale Image Context

One successful approach to image deblurring that has been used in recent work ([2], [3], [4]) is to use image information at multiple scales of the input image. In [2] and [3], an input image is first down-sampled twice by a factor of two to obtain two smaller scales of the image (one half and a quarter size of the original image). In [2], the deblurring result at the coarser scale goes through a trained up-convolution process before being concatenated to the input image of the next finer scale. In [3], the deblurring result at the coarser scale is upsampled using bilinear interpolation before being concatenated to the input image at the next finer scale. In [4] and [5], a dilated convolution method is used, which saves the additional work of having to resize the image multiple times. A dilated convolution is a linear process where convolution is performed using an l-dilated filter, shown in FIG. 1 to produce a coarser scaled image for l>1.

A dilated filter has the coefficients of the kernel spread apart by a distance determined by the dilation factor, l. In an l-dilated convolution, a dilated filter is not constructed but each kernel coefficient is applied with a separation of l points between each coefficient. This means that the number of coefficients in the kernel is not increased and the coefficients are applied with a spatial separation. This is achieved by using the discrete 2D convolution operation between an image F(t,s) and the kernel k(t,s) as described in (1).

$$(F*k)[t,s]=\Sigma_{\delta=-\infty}^{\infty}\Sigma_{\tau=-\infty}^{\infty}F[t-\tau,s-\delta]k[\tau,\delta] \quad (1)$$

A dilated convolution can then be written with a dilated convolution operator $*_l$ as in (2).

$$(F*_l k)[t,s]=\Sigma_{\delta=-\infty}^{\infty}\Sigma_{\tau=-\infty}^{\infty}F[t-l\tau,s-l\delta]k[\tau,\delta] \quad (2)$$

Context Sharing Between Scales

Multi-scale image deblurring methods use information learned at coarse scales to add context to an image at finer scales. To accomplish this, [2] and [4] share scale context through a convolutional layer. In [2], this is done by concatenating the result from a coarser scale to the input image of the next finer scale. In [4], this is done by concatenating the results from the full multi-scale process. Both approaches then apply a trainable single-layer convolution to share contextual information between scales.

The method implemented in [2] shares coarse-to-fine information once from each coarse scale to the next finer scale, sharing context information two times in total (i.e., from scale 3 to 2, and from scale 2 to 1, original size). FIG. 2 outlines the method implemented by Shi et. al. [4], which shares information at each convolutional layer within an inception style module/block. The modified inception block of [4] uses dilated convolutions for the simultaneous processing steps of the inception block shown in FIG. 2.

Tao et al. [3] use an approach similar to that of [2], by concatenating the result from the coarse deblurring to the next finer-scale input. Additional sharing of contextual information between scales is introduced in the form of a recurrent connection. The overall architecture used has an hourglass shape (autoencoder style network) and the recurrent connections are included in the center layer of the autoencoder. The recurrent connection used in [3] is a convolutional long-short term memory (LSTM) cell, as developed in [6]. In an LSTM cell, the flow of information (i.e., what is saved and passed along) is controlled by a series of gates (convolutional layers and activation functions).

SUMMARY OF THE INVENTION

In this paper, we have created a neural network with a low number of parameters, that is capable of deblurring an image with no prior information given. In our proposed method, we will employ a dilated convolution approach to obtain information at different scales as it does not involve any upsampling or downsampling steps. Our aim is to design a compact neural network (with a low number of parameters) that is capable of deblurring an image for which no prior statistical or blurring information is available. Our proposed network will employ a convolutional LSTM cell to share information between layers within an inception style block. With the implementation of the LSTM-Inception block, we created a network that used 96% fewer trainable parameters than that of the SRN-DeblurNet [3] network, while achieving similar deblurring performance. This network was able to deblur images at a comparable level to other image deblurring methods [2], [3] with lower computational efficiency.

Accordingly, there is provided according to the invention a computer-implemented method for deblurring an image, comprising, in a neural network:

a. using a processor to pass an input image file through at least three dilated image filters in parallel to produce an output file for each at least three dilated image filters, each of said at least three dilated image filters having a different resolution from most coarse resolution to most fine resolution, and including one or more intermediate resolutions;

b. using said processor to supply a most coarse resolution output file from said at least three dilated image filters as a first input to an LSTM cell, followed by supplying an intermediate resolution output file from said at least three dilated image filters as a second input to the LSTM cell, followed by supplying a most fine resolution output file from said at least three dilated image filters as a third input to the LSTM cell;

c. adding an output of the LSTM cell to said input image file via a residual connection to produce an LSTM inception block output file;

d. using said LSTM inception block output file as a new input image file and repeating steps a. through c. at least three times.

There is further provided according to the invention a computer-implemented method for deblurring an image, wherein no additional information concerning the image is provided to said processor.

There is further provided according to the invention a computer implemented method for deblurring an image wherein steps a. through c. are repeated four to ten times.

There is further provided according to the invention a computer implemented method for deblurring an image, wherein steps a. through c. are repeated more than ten times.

There is further provided according to the invention a computer implemented method for deblurring an image wherein said input image file is passed through four to ten dilated image filters in parallel to produce an output file for each dilated image filter, each said dilated image filters having a different resolution from most coarse resolution to most fine resolution, and including one or more intermediate resolutions; and wherein said processor supplies a most coarse resolution output file from said dilated image filters as a first input to an LSTM cell, followed by supplying intermediate resolution output files from said dilated image filters in order of more coarse resolution to more coarse resolution as sequential inputs to the LSTM cell, followed by supplying a most fine resolution output file from said dilated image filters as a further input to the LSTM cell.

There is further provided according to the invention a computer implemented method for deblurring an image which requires at least 50% fewer trainable parameters than an SRN-DeblurNet network.

There is further provided according to the invention a computer implemented method for deblurring an image which requires at least 75% fewer trainable parameters than an SRN-DeblurNet network.

There is further provided according to the invention a computer implemented method for deblurring an image which requires at least 85% fewer trainable parameters than an SRN-DeblurNet network.

There is further provided according to the invention a computer implemented method for deblurring an image which requires 96% fewer trainable parameters than an SRN-DeblurNet network.

There is further provided according to the invention a computer implemented method for deblurring an image wherein said neural network is trained using a standard mean squared error loss (MSE):

$$MSE = \frac{1}{n}\sum_{i=1}^{n}(X_i - \hat{X}_i)^2$$

where n is a number of pixels in a training image, X is a target output, and X^ is a recovered output from the network, where a learning rate (or step-size for the weight updates) for training the network is 1e$^{-5}$ and an optimization algorithm used to train the network is adaptive moment estimation algorithm (Adam).

BRIEF DESCRIPTION OF THE DRAWINGS

The foregoing summary, as well as the following detailed description of the preferred invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 shows a scale inception block.
FIG. 5 shows a network configuration training loss comparison.
FIG. 7 shows deblurring results of Tao et al. and the present method.

DETAILED DESCRIPTION OF THE INVENTION

We propose an LSTM inception block structure that makes use of several of the previously discussed features, as well as residual skip connections, which are detailed in [7]. The inception block diagram is shown in FIG. 3(a).

The proposed inception block structure is composed of a self-contained, scale-recurrent system with a residual connection that adds the input of the block to the output of the recurrent cells. In our experiments, the 2D dilated convolution and LSTM gate convolutions all use a 5×5 kernel. The input to each block is convolved with the 3-dilated filters, 2-dilated filters, and 1-dilated filters (producing progressively coarse to fine images). Thus, the dilated convolutional filters have an effective kernel size of 13×13, 9×9, and 5×5 respectively, while only using 25 weights each (not including bias). The results are then supplied as inputs to the LSTM cell in order of coarse-to-fine (3-dilated, 2-dilated, then 1-dilated). The output of the LSTM cells is then added to the input of the inception block via a residual connection, before being passed to the next layer of the network. The residual connection allows information to be directly conveyed from the input to the output of the inception block and does not prevent end-to-end training of a network using backpropagation.

Figure 1A:
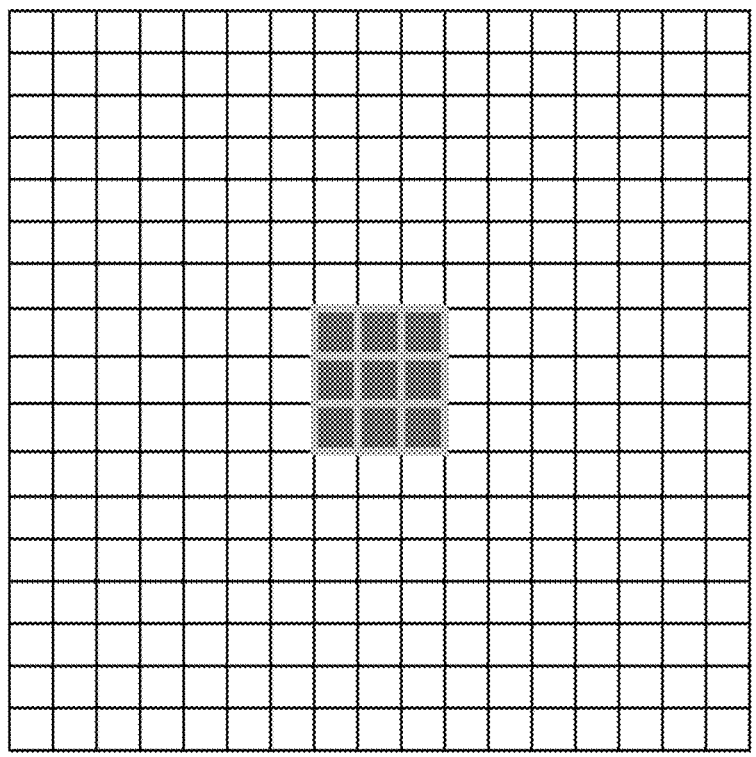
FIG. 1A shows a 1-dilated convolution kernel.
Figure 1B:
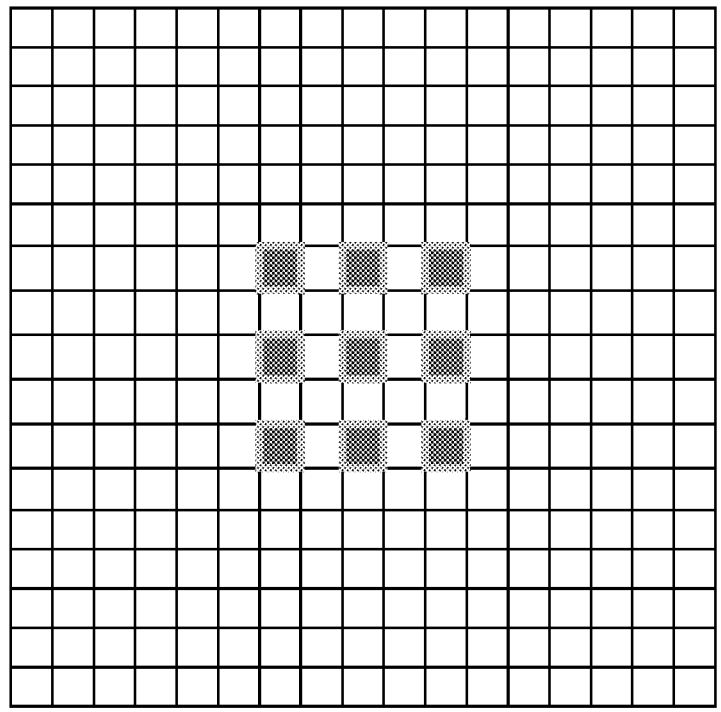
FIG. 1B shows a 2-dilated convolution kernel.
Figure 1C:
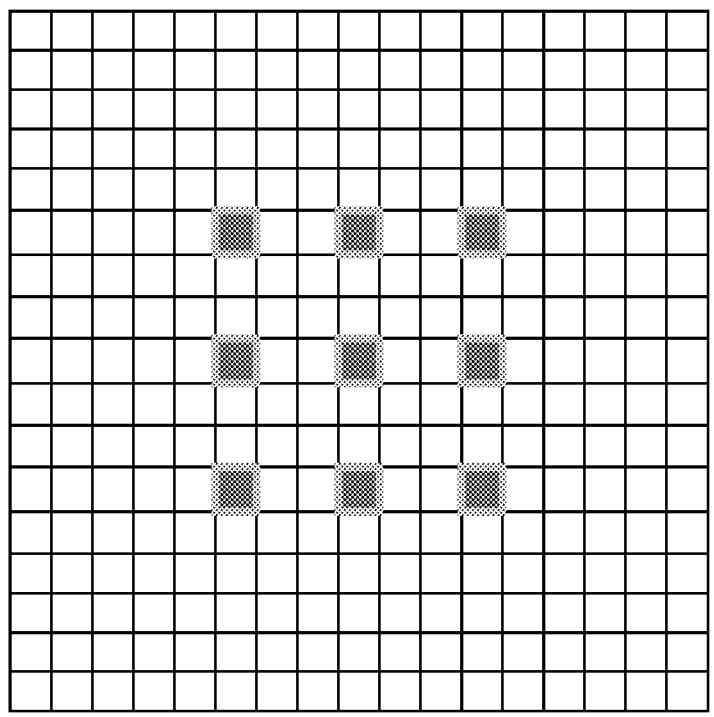
FIG. 1C shows a 3-dilated convolution kernel.
Figure 3A:
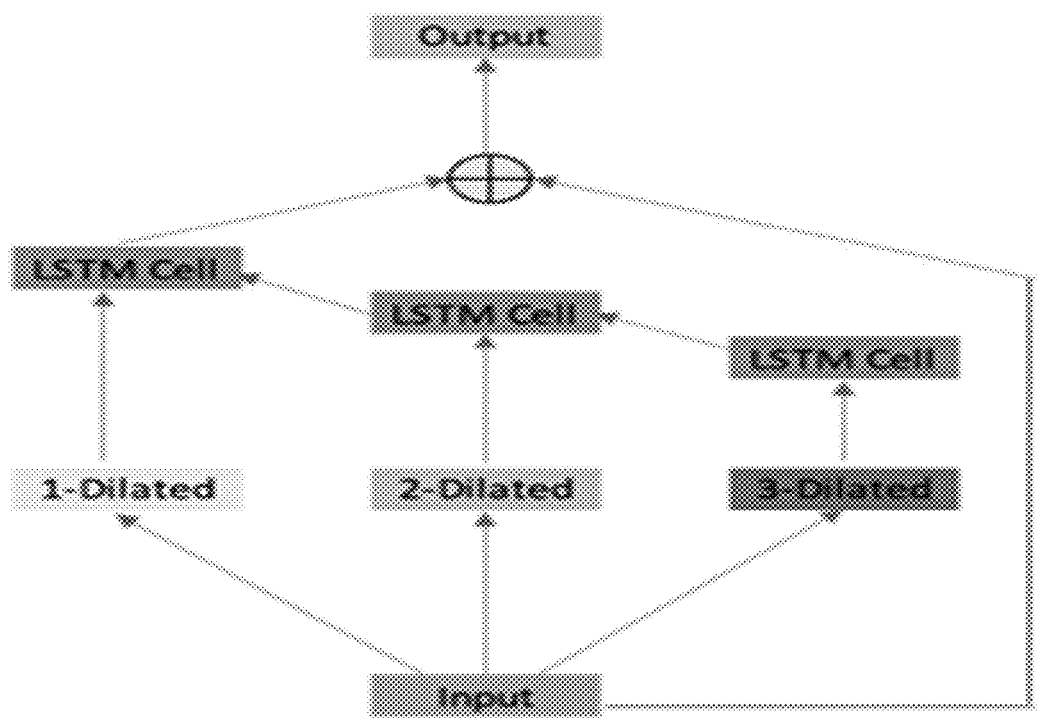
FIG. 3A shows a proposed Network Structure for an LSTM-inception block.
Figure 3B:
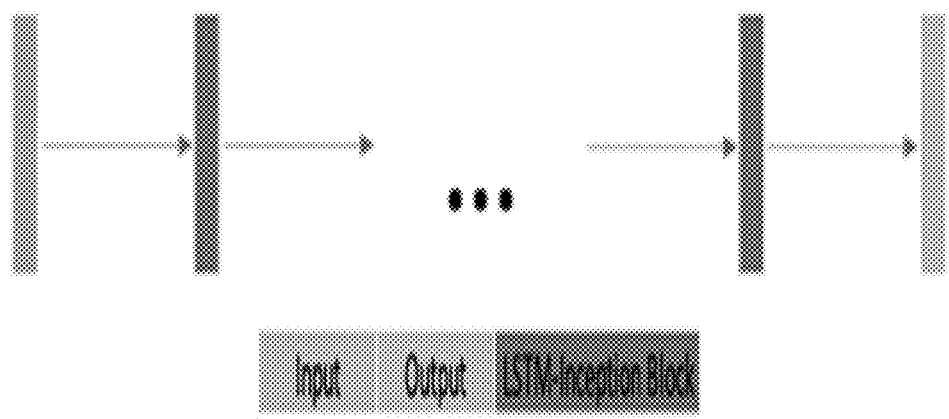
FIG. 3B shows a proposed network structure for stacked LSTM-inception blocks.

The LSTM-Inception blocks of FIG. 3(a) can be stacked to form a network that can be trained to deblur images. Since the blocks are identical, the number of hidden layers in the network can be varied as indicated in FIG. 3(b). The loss function used to train the network is the standard mean squared error loss (MSE) given in (3), although any loss function may be used to train the network:

$$MSE = \frac{1}{n}\sum_{i=1}^{n} (X_i - \hat{X}_i)^2 \quad (3)$$

where n is the number of pixels in the image, X is the target output, and X^ is the recovered output from the deblurring network. The chosen learning rate (or step-size for the weight updates) for training this network is $1e^{-5}$. The optimization algorithm chosen to train the network is the well-known adaptive moment estimation algorithm (Adam), as this has been shown to be successful in other deblurring and CNN architectures. Adam optimization was designed to be an efficient optimization algorithm for large datasets, with high dimensional-parameter spaces. The algorithm uses exponential moving averages of the gradient and squared gradient of the loss function with respect to weights of the network. Hyper-parameters $\beta_1$ and $\beta_2$ control the rate of exponential decay and $\epsilon$ is a small number used to prevent division by zero. We use the recommended parameters from [8], i.e. $\beta_1=0.9$, $\beta_2=0.999$, and $\epsilon=10^{-8}$.

Network Architecture

Figure 4A:
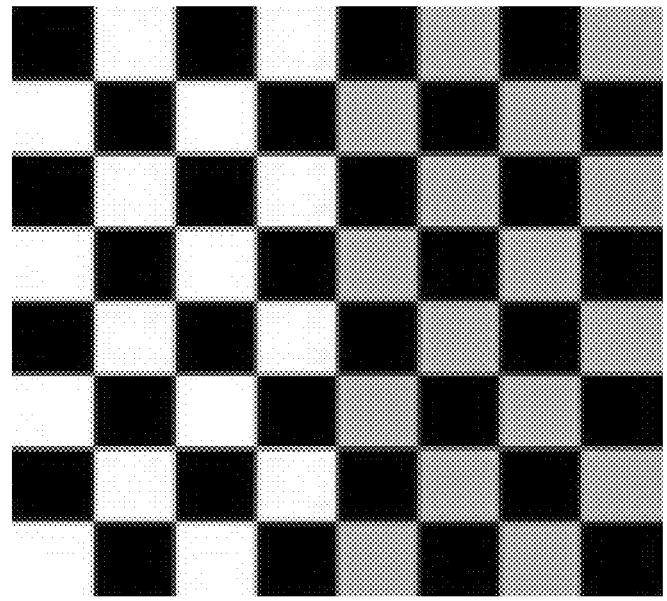
FIG. 4A shows a pristine checkerboard image.

We first set out to determine an optimal structure for a network composed of the proposed LSTM-Inception blocks. The goals of this process are (i) to determine the number of stacked LSTM-Inception blocks to use in this network and (ii) to determine whether a global skip connection should be included. Four different network configurations are evaluated in this work. These consist of two 3-layer stacked LSTM-Inception blocks and two 6-layer stacked LSTM-Inception blocks, each with or without a global skip connection. We trained each network to deblur the checkerboard image shown in FIG. 4(b); i.e., a single test image. This blurred checkerboard image was created as test data from the pristine image of FIG. 4(a), by using the square Gaussian kernel, k(t,s) given in (4) below with $\sigma_t=\sigma_s=5$.

$$k(t, s) = \frac{1}{2\pi\sigma^2}\exp\left(-\left(\frac{(t-t_0)^2}{2\sigma_t^2} + \frac{(s-s_0)^2}{2\sigma_s^2}\right)\right) \quad (4)$$

Each network was initialized using Xavier initialization [9] and trained for 15,000 iterations. Xavier initialization randomly sets the starting network weights in the range [−1,1] and then scales them by (1/m), where m is the number of weights in the filter. The loss function used was MSE, and the Adam optimizer [8] was used to determine the parameter updates. After training, each network was evaluated using the following three loss metrics: MSE, peak signal-to-noise ratio (PSNR), and structural similarity (SSIM).

Figure 4B:
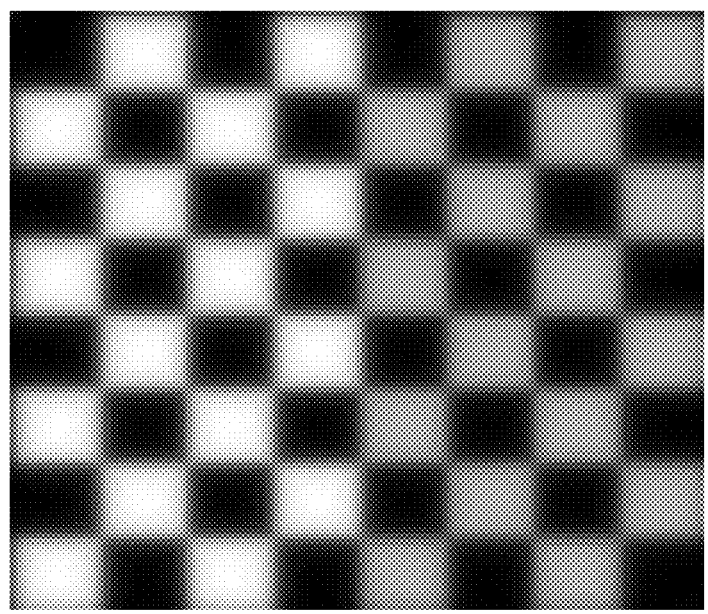
FIG. 4B shows a blurred checkerboard image.

FIG. 5 shows the progression of the MSE loss function for each of the four network configurations over 15,000 iterations of the training, starting with the blurred image of FIG. 4(b). Table 1 shows the final values of the three metrics, which were used to evaluate the deblurring performance of these four network configurations. From Table 1, it is observed that the best performing network after training was the 6-layer LSTM-Inception block network w/global skip connection as it produced the lowest MSE, highest PSNR, and highest SSIM. Also, we note from FIG. 5, that the loss is lowest at the end of the training for the 6-layer LSTM-Inception block network with a global skip connection.

TABLE 1

Evaluation of network configurations.

|  | Blurry T- Input Image | 3-layer LSTM-Inception blocks | 3-layer LSTM-Inception blocks w/global skip | 6-layer LSTM-Inception blocks | 6-layer LSTM-Inception blocks w/global skip |
|---|---|---|---|---|---|
| MSE: | 0.0375 | 0.0245 | 0.0288 | 0.0261 | 0.0239 |
| PSNR: | 14.2581 | 16.1050 | 15.4044 | 15.8265 | 16.2160 |
| SSIM: | 0.9958 | 0.9975 | 0.9969 | 0.9972 | 0.9976 |

Network Training

To further evaluate the capabilities of the network, training and testing was done using more complex natural images.

Two test datasets were created from the pristine images of the GOPRO dataset [2]. (A) For the first dataset blurry images were created using two different blur kernels, the 29×29 symmetric Gaussian blur kernel with $\sigma_t=\sigma_s=5$ as in given (4), and a 30×30 bi-directional blur kernel. (B) Blurry images for the second dataset were created from the GOPRO dataset using six blur kernels (of average size of 30×30), which had been obtained and approximated from the Kohler dataset [10]. For each of these test datasets, the blur kernels were applied evenly over the 2103 sharp training images and 1111 sharp test images of the GOPRO dataset [2].

Figure 6A:
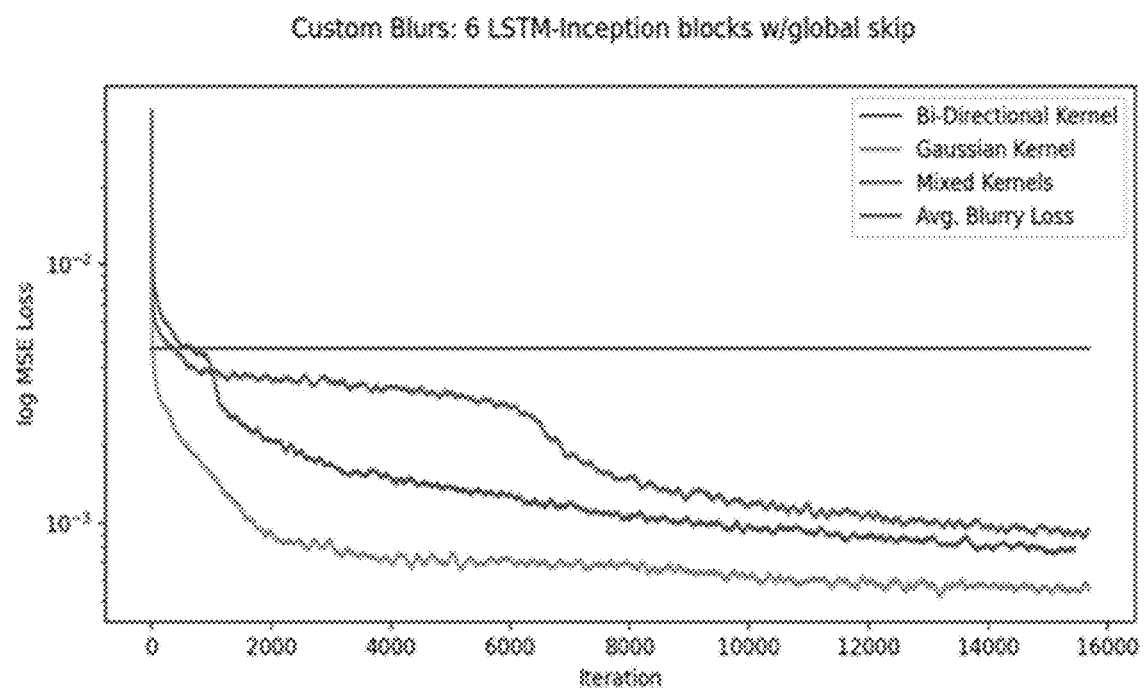
FIG. 6A shows training loss with a custom 2-kernel dataset.
Figure 6B:
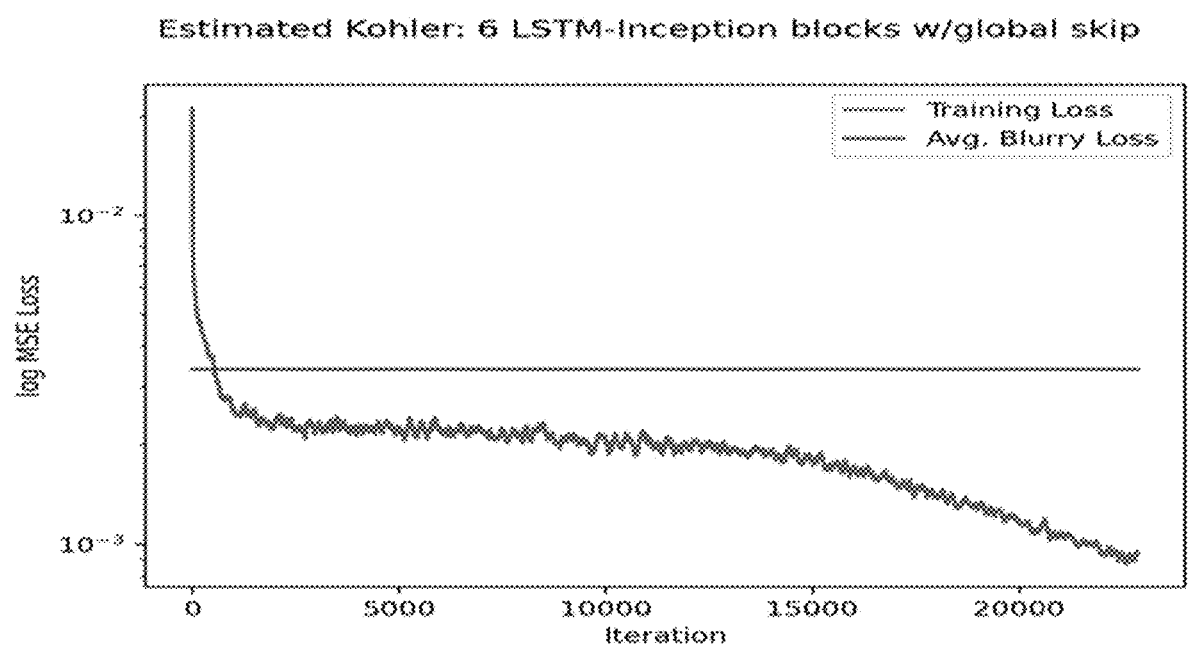
FIG. 6B shows training loss with a custom 6-kernel dataset.

For training with each dataset, the network parameters were initialized using Xavier initialization [9], the parameters were optimized using Adam [8], and the learning rate was set to $1e^{-5}$. The input images were scaled by one half, to a size of 360×640, and randomly selected in minibatches of five (i.e., 5 images per each pass through the network). Gradient accumulation was done after every second iteration to reduce the effects of a small minibatch size. In both cases, the network was able to improve the image quality and therefore deblur the input image. Plots of the training loss are shown in FIG. 6. We observe that the chosen network configuration is able to improve the blurry image and recover an image that appears to be close to the pristine image.

Network Evaluations and Comparisons

To compare the performance of our proposed 6-layer LSTM-Inception blocks w/global skip network against others that perform blind image deblurring using neural networks, we trained our network using the unaltered GOPRO dataset [2] (2103 blurry and sharp image pairs). The dataset uses captured frames from recorded real-world scenes to create images that simulate natural blur. This is the same dataset used for training in both [2] and [3]. We trained our network as described above using Xavier initialization [9], Adam optimization [8], learning rate of $1e^{-5}$, randomly selecting 5 images scaled to half size (360×640) for a minibatch and using a 2-iteration gradient accumulation.

TABLE 2

GOPRO dataset [2] performance comparison

| GOPRO Dataset[2] | Chen et al. (InceptionResDensenet) [11] | Nah et al. [2] | Tao et al. (SRN-DeblurNet) [3] | Proposed network |
|---|---|---|---|---|
| PSNR: | 27.79 | 29.08 | 30.26 | 28.54 |
| SSIM: | 0.8472 | 0.9135 | 0.9342 | 0.9090 |

TABLE 3

Kohler dataset [10] performance comparison

| Kohler Dataset [10] | Nah et al. [2] | Tao et al. (SRN-DeblurNet) [3] | Proposed network |
|---|---|---|---|
| PSNR: | 26.48 | 26.75 | 25.20 |
| Mean SSIM: | 0.8079 | 0.8370 | 0.7897 |

TABLE 4

Network parameter counts.

| Number of Trainable Parameters | Tao et al. (SRN-DeblurNet) [3] | Proposed network |
|---|---|---|
| | 8,056,609 | 336,690 |

Our optimization method and parameters are identical to that of [3] except that we use a lower learning rate throughout the entire training process, while in [3] the learning rate is reduced from $1e^{-4}$ to $1e^{-6}$ after 2000 epochs. We also trained with the images scaled to half-size while [2] and [3] trained using 256×256 image patches. As in [3] we used MSE as our loss function, while in [2] a combination of MSE and generative adversarial loss was used. The authors of [2] introduce random geometric transformations, random color permutations, and randomly added Gaussian noise to the blurry images during training. This was not done in [3] and this was not included in our training either. We trained for 1,120 epochs and then evaluated the status of the deblurring capabilities of the network. Table 2 shows results from testing networks from [2], [3], [11] and our proposed network with the GOPRO test dataset [2]. Table 3 shows results of testing networks from [2], [3] and our proposed network with the 48 blurry images of the Kohler dataset [10]. We note that our proposed network is able to deblur the images in both test datasets comparably to Nah et al. [2] and Tao et al. [3], and the PSNR and SSIM values obtained by our network on the GOPRO dataset [2] were higher than that of Chen et al. [11] indicating better performance. Table 4 shows that our proposed network uses 4% of the total number of parameters used by Tao et al. [3] in their SRN-DeblurNet. Tao et al. [3] used the same set of deblurring parameters at each scale to, therefore using fewer parameters than Nah et al. [2]. Therefore, our proposed network also uses much fewer parameters than used in [2].

FIG. 7 shows a visual comparison of the deblurring performance of our network and that of Tao et al. [3] for six natural images. In each case, the original blurry is shown in column 1, while the final deblurred image produced by the method of Tao et. al. [3] is shown in column 2, and the final result of using our proposed network can be found in column 3 of FIG. 7. This shows that our network is able to deblur these natural images with acceptable performance, especially considering the fact that it used a much smaller number of parameters (4% of the current state-of-the-art networks).

In summary, the invention described herein is a novel and unobvious neural network with a low number of parameters capable of deblurring an image with no prior information given. With the implementation of the LSTM-Inception block, the invention presents a network that used 96% fewer trainable parameters than that of the SRN-DeblurNet [3] network, while achieving similar deblurring performance. This network was able to deblur images at a comparable level to other image deblurring methods [2], [3] but with improved computational efficiency.

It will be appreciated by those skilled in the art that changes could be made to the preferred embodiments described above without departing from the inventive concept thereof. It is understood, therefore, that this invention is not limited to the particular embodiments disclosed, but it is intended to cover modifications within the spirit and scope of the present invention as outlined in the present disclosure and defined according to the broadest reasonable reading of the claims that follow, read in light of the present specification.

REFERENCES

[1] D. Kundur and D. Hatzinakos, "Blind image deconvolution," IEEE Signal Processing Magazine, vol. 13, no. 3, pp. 43-64, May 1996

[2] Nah, Seungjun, Tae Hyun Kim, and Kyoung Mu Lee. "Deep multi-scale convolutional neural network for dynamic scene deblurring." Proceedings of the IEEE Conference on Computer Vision and Pattern Recognition. 2017.

[3] X. Tao, H. Gao, X. Shen, J. Wang and J. Jia, "Scale-Recurrent Network for Deep Image Deblurring," 2018 IEEE/CVF Conference on Computer Vision and Pattern Recognition, Salt Lake City, U T, 2018, pp. 8174-8182. doi: 10.1109/CVPR.2018.00853

[4] W. Shi, F. Jiang and D. Zhao, "Single image super-resolution with dilated convolution based multi-scale information learning inception module," 2017 IEEE International Conference on Image Processing (ICIP), Beijing, 2017, pp. 977-981. doi: 10.1109/ICIP.2017.8296427.

[5] F. Yu, V. Koltun, "Multi-scale context aggregation by dilated convolutions", International Conference on Learning Representations, 2016.

[6] Shi, X., Chen, Z., Wang, H., Yeung, D. Y., Wong, W. K., & Woo, W. C. (2015). Convolutional LSTM network: A machine learning approach for precipitation nowcasting. Advances in neural information processing systems, 28, 802-810.

[7] He, K., Zhang, X., Ren, S., & Sun, J. (2016). Deep residual learning for image recognition. In Proceedings of the IEEE conference on computer vision and pattern recognition (pp. 770-778).

[8] Kingma, Diederik P., and Jimmy Ba. "Adam: A method for stochastic optimization." arXiv preprint arXiv: 1412.6980 (2014).

[9] Xavier Glorot and Yoshua Bengio. Understanding the difficulty of training deep feedforward neural networks. In Aistats, volume 9, pages 249-256, 2010.

[10] Köhler, R., Hirsch, M., Mohler, B., Schölkopf, B., & Harmeling, S. (2012, October). Recording and playback of camera shake: Benchmarking blind deconvolution with a real-world database. In European conference on computer vision (pp. 27-40). Springer, Berlin, Heidelberg.

[11] Z. Chen and L. Chang, "Blind Motion Deblurring via Inceptionresdensenet by Using GAN Model," ICASSP 2019-2019 IEEE International Conference on Acoustics, Speech and Signal Processing (ICASSP), Brighton, United Kingdom, 2019, pp. 1463-1467. doi: 10.1109/ICASSP.2019.8683728

The invention claimed is:

1. A computer implemented method for deblurring an image, comprising,
    a. inputting an image file into a computer memory,
    b. using a computer processor to retrieve an image file from said computer memory,
    c. using said computer processor to pass said image file through a neural network comprising at least three dilated image filters in parallel to produce an output file for each at least three dilated image filters, each of said at least three dilated image filters having a different resolution from a most coarse resolution to a most fine resolution, including one or more intermediate resolutions;
    d. using said computer processor to supply said most coarse resolution output file from said at least three dilated image filters as a first input to a long-short term memory "LSTM" cell of said neural network, followed by supplying an intermediate resolution output file from said at least three dilated image filters as a second input to the LSTM cell, followed by supplying said most fine resolution output file from said at least three dilated image filters as a third input to the LSTM cell;
    e. adding an output of the LSTM cell to said image file via a residual connection to produce an LSTM inception block output file;
    f. using said LSTM inception block output file as a new image file and repeating steps c. through e. at least three times;

wherein said neural network is trained using a standard mean squared error loss (MSE):

$$MSE = \frac{1}{n}\sum_{i=1}^{n}(X_i - \hat{X}_i)^2$$

where n is a number of pixels in a training image, X is a target output, and X^ is a recovered output from the network, where a learning rate (or step-size for the weight updates) for training the network is 1e-5 and an optimization algorithm used to train the network is adaptive moment estimation algorithm (Adam).

2. The computer-implemented method according to claim 1, for deblurring an image, wherein no additional information concerning the image is provided to said processor.

3. The computer implemented method according to claim 1, wherein steps 1a. through 1c. are repeated four to ten times.

4. The computer implemented method according to claim 1, wherein steps 1a. through 1c. are repeated more than ten times.

5. The computer implemented method according to claim 1,
    wherein said input image file is passed through four to ten dilated image filters in parallel to produce an output file for each dilated image filter, each said dilated image filters having a different resolution from most coarse resolution to most fine resolution, and including one or more intermediate resolutions; and
    wherein said processor supplies a most coarse resolution output file from said dilated image filters as a first input to an LSTM cell, followed by supplying intermediate resolution output files from said dilated image filters in order of more coarse resolution to more coarse resolution as sequential inputs to the LSTM cell, followed by supplying a most fine resolution output file from said dilated image filters as a further input to the LSTM cell.

6. The computer implemented method according to claim 1 which requires at least 50% fewer trainable parameters than a Scale recurrent Network ("SRN")-DeblurNet network.

7. The computer implemented method according to claim 1, which requires at least 75% fewer trainable parameters than a SRN-DeblurNet network.

8. The computer implemented method according to claim 1, which requires at least 85% fewer trainable parameters than a SRN-DeblurNet network.

9. The computer implemented method according to claim 1, which requires 96% fewer trainable parameters than a SRN-DeblurNet network.

* * * * *